April 19, 1949.  H. M. STEPHENSON  2,467,870
ELECTRIC MOTOR DRIVING MECHANISM
Filed Aug. 28, 1947
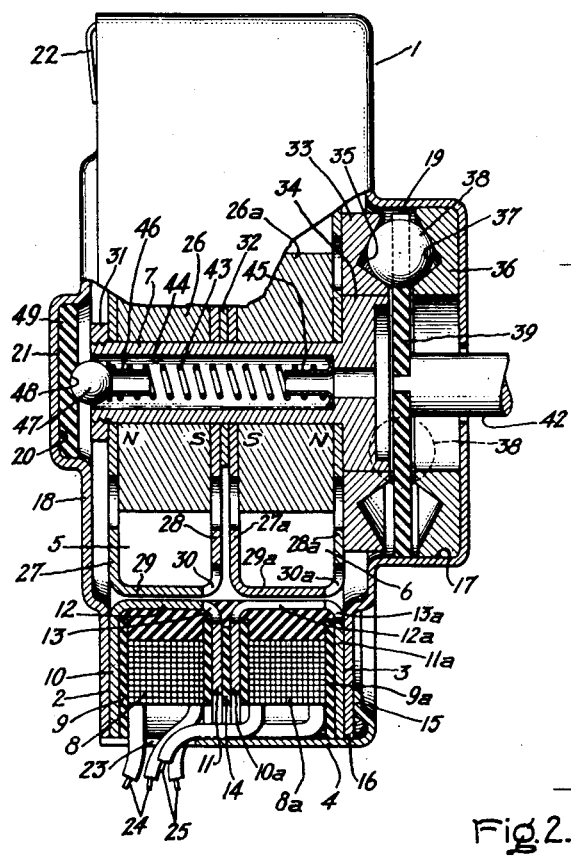
Inventor:
Hugh M. Stephenson,
by Prowell P. Mack
His Attorney.

Patented Apr. 19, 1949

2,467,870

UNITED STATES PATENT OFFICE 2,467,870

ELECTRIC MOTOR DRIVING MECHANISM

Hugh M. Stephenson, Fort Wayne, Ind., assignor to General Electric Company, a corporation of New York Application August 28, 1947, Serial No. 771,074

13 Claims. (Cl. 318—15)

This invention relates to improved driving mechanisms having speed reduction and bearing elements and more particularly to such mechanisms for recording and reproducing apparatus and the like.

It is desirable in the design of recording and reproducing apparatus to secure a complete driving mechanism which accomplishes the necessary speed reduction, will start a high inertia load, smoothes out speed variations, and provides a high value of torque in a simple, compact, light weight and low cost unit. To provide these features it is particularly desirable to combine the speed reduction and bearing elements into one unitary structure.

It is an object of this invention to provide an improved driving mechanism for recording and reproducing apparatus and the like.

Another object of this invention is to provide an improved speed-changing power transmission and thrust-bearing device.

A further object of this invention is to provide an improved driving mechanism in which the speed reduction and bearing elements are incorporated in a single unit.

Further objects and advantages of this invention will become apparent and the invention will be better understood from the following description referring to the accompanying drawings. The features of this invention which are believed to be novel and patentable will be pointed out with particularity in the claims annexed to and forming a part of this specification.

For a better understanding of this invention, reference is made in the following description to the accompanying drawing in which Fig. 1 illustrates a side view, partly in section, of a driving mechanism embodying the present invention, Fig. 2 shows an exploded view of the ball race members and ball retaining member which forms the speed reduction and bearing elements of Fig. 1, and Fig. 3 is a schematic illustration showing the method of computing the correct angles for the races of the ball race members.

In carrying out the present invention, there are provided two ball race members with a plurality of intermediate planetary balls carried and spaced by a retaining member. One race member is driven by an external source of mechanical power, such as a motor, and the other is held stationary. The race members, embracing the planetary balls in their retainer, form a thrust and radial bearing for the motor rotor and a guide housing for the retaining member. The retaining member is connected to a driven shaft and is driven by the planetary motion of the balls at a speed different from the speed of the motor, thus forming with the race members and the balls, a ball differential speed-changing transmission. The ball races are provided with four-point contact with the balls to permit a true rolling ball differential transmission.

Referring now to Fig. 1, there is shown the speeding-reduction ball differential and bearing device of this invention utilized with a single phase motor 1 of the type described in application Serial Number 771,073, filed August 28, 1948, and assigned to the assignee of the present application. It can be seen that this motor is essentially composed of two single phase motor elements placed side by side, the stator members 2 and 3 being mounted in a common shell or casing 4 of magnetic material, and the rotor members 5 and 6 being mounted on a common shaft 7.

The single phase stator member 2 cooperating with the rotor member 5 comprises an annular single phase alternating current energizing coil 8 wound on a spool member 9 formed of insulating material. Closely abutting the exterior walls of the spool member are two identical washer-shaped magnetic iron members 10 and 11 which fit snugly within the shell member 4. These washer-shaped members are provided with the same number of evenly spaced punched or cut salient pole teeth 12 and 13 which are bent axially toward each other to intermesh in opposed pairs to present two adjacent internal peripheries of intermeshed pairs of teeth. The other single phase stator member 3 which cooperates with the rotor member 6 is similar to the one just described above and its corresponding parts are designated by like reference characters followed by the letter $a$. The two stator members 2 and 3 are separated by a non-magnetic spacer member 14.

The pair of punchings 12 and 13 of stator member 2 are indexed ahead of the corresponding pair of punchings 12$a$ and 13$a$ of stator member 3 by ¼ tooth pitch and the two stator members are then molded together in a plastic compound to maintain the proper tooth relation. The outer magnetic shell member 4 is common to both stator members and forms a closure for the magnetic circuits of the stator structure. This shell is preferably a drawn steel shell which is open at one end and which has a flange 15 formed at the other end thereof. A drawn non-magnetic end flange 16 having a cavity 17 is pressed into the shell 4 and abuts the flange 15. Flange member 18, also formed of non-magnetic material, is provided at the other end of the motor. The cavity 17 in the end flange 16 is formed to support the ball differential and bearing assembly 19, and the flange 18 contains a cavity 20 to accommodate a ball thrust bearing assembly 21, both of which will be described in detail hereinafter.

The rotor members 5 and 6 are supported between the ball differential and bearing assembly 19 and the ball thrust bearing assembly 21, and the entire motor and speed-reducing mechanism is fastened together by a plurality of clamping members 22 to form a single unitary structure. These clamping members are fully described and illustrated in application Serial Number 771,019, filed August 28, 1948, now Patent 2,456,934 issued December 21, 1948, and assigned to the assignee of the present application.

An opening, or openings 23 are cut into the stator shell 4 in order to bring out the leads 24 and 25 for the coils 8 and 8a. A condenser (not shown) is included in the circuit of one of the coils 8 and 8a so that the single phase fluxes of the two motor elements are 90° out of phase. The circuits of the two coils are connected in parallel to a single phase source of electric power.

Referring now to the rotor member 5, the hollow, non-magnetic shaft 7 of the motor passes through a circular bore of a cylindrical shaped permanent magnet 26. This magnet is polarized axially parallel to the axis of the shaft 7, as indicated in Fig. 1. Abutting the opposite sides of the permanent magnet are identical magnetic iron spider members 27 and 28. These members are provided with the same number of evenly spaced salient pole teeth 29 and 30, equal in number to the stator teeth. These teeth are bent axially toward each other to intermesh in opposed pairs presenting two adjacent external peripheries of intermeshed teeth adjacent and concentric with the rows of teeth 12 and 13 of the stator member 2 and forming an air gap therebetween. The other rotor member 6 is similar to the one just described and its corresponding parts are designated by like reference characters followed by the letter $a$. The hollow shaft 7 is common to both rotor elements, and in assembly these elements can be secured to the shaft by a threaded nut 31 so that the rotor parts including the plates of the spider members and the permanent magnets which they embrace are securely held in proper alignment.

The adjacent spider members 28 and 27a are separated by a non-magnetic spacing washer member 32 and the magnets 26 and 26a are mounted on shaft 7 in opposition, for instance, as shown here with their south poles adjacent. The teeth 29 of rotor member 5 are aligned axially with the teeth 29a of rotor member 6 and the teeth 30 are likewise aligned with the teeth 30a. In addition, the rotor members 5 and 6 are preferably positioned so that the teeth 29 and 29a are of opposite magnetic polarity and the teeth 30 and 30a likewise of opposite magnetic polarity.

A full description of the operation of this motor is contained in the aforesaid application Serial Number 771,073. While a motor of this type has been shown, it is to be understood that any type of mechanical driving power can be utilized with this invention.

Referring to Figs. 1 and 2, it will be seen that mechanically, the rotor members 5 and 6, mounted on hollow shaft 7, are supported by a rotary driving ball race member 33 mounted on rotor hub 34 and the ball thrust bearing assembly 21. The ball race member 33 is provided with an annular groove or race 35 formed in one side or face. A stationary ball race member 36 is mounted in the rear of cavity 17 of end flange 16 spaced from the driving race member and is also provided with an annular groove or race 37 formed in a side or face coaxial with groove 35. A plurality of planetary antifriction elements or balls 38 are arranged between the ball race members 33 and 36 and engage the grooves 35 and 37 at two points respectively, i. e., the balls contact two circular raceways on each groove. As thus far described, the driving ball race member 33 which is driven at a predetermined speed by the motor 1, the balls 38, and the stationary ball race member 36 form a thrust and radial bearing.

Interposed between the ball race members is a ball retaining and spacing member 39 provided with ball separating recesses 40, and slot 41 in which is fitted a tongued driven shaft 42. The retaining member 39 with the balls 38 and race members 33 and 36 form a ball differential speed-reducing transmission, the planetary motion of the balls 38 being imparted to drive the retaining member and driven shaft. While three balls 38 are shown here, it will be understood that any sufficient number to provide a bearing would be satisfactory.

In order to insure that there is sufficient pressure on the ball race members and balls to insure driving torque to the retaining member, driving ball race member 33 is resiliently urged toward the stationary member 36 by thrust spring member 43. This spring 43 is carried in the cavity 44 in shaft 7, one end being positioned around spring seat 45 which abuts rotor flange 34 at the differential end of the cavity, and the other being positioned around spring seat 46 at the opposite end of the cavity. A thrust ball 47 is carried by spring seat 46 and is seated in a pocket 48 in thrust disk 49 which is in turn seated in the cavity 20 in the end flange 18.

This thrust combination is set up with sufficient pressure to maintain the concentricity of the rotor in the stator air gap, as well as to afford sufficient driving torque to the ball retaining member 39, the pressure being adjusted to provide a positive rolling differential drive supplying sufficient torque to drive the load satisfactorily, but also allowing slipping of the balls 38 in races 35 and 37 at some predetermined torque less than the maximum motor torque.

By proper proportionment of the elements of this ball differential, a substantially two to one speed reduction (shown here) or any other speed reduction in a practical range from 1.4 to 1 to 3.5 to 1 can be obtained.

Referring now particularly to Fig. 3, it will be seen that the balls 38 are in contact with each race at two points, each race having two walls respectively tangent to the balls at these points. The proper relationship to insure perfect rolling ball differential speed reduction is with the four points of tangency of the two ball race members with the balls located at the base points of a double isosceles triangle, the peak of the triangle being on the centerline of the axis of rotation of the driven shaft 42. The following method is used to compute the proper angles to secure perfect rolling ball differential reduction. Assuming the radius of the ball centers = B, the radius of the balls = R, and the arbitrary chosen outer angle at the point of tangency with respect to the plane of the ball race = D°, the proper inner angle A° is obtained by the following procedure:

$$Y = R \sin D°$$
$$X = R \cosine D°$$
$$\tan(D° + E°) = \frac{B+X}{Y} = \tan F°$$
$$F° - D° = E°$$
$$90° - E° = G°$$
$$180° - 2G° = H°$$
$$180° - (D° + H°) = A°$$

The above procedure results in a correct design to obtain a ball differential having two tangential contact points in each of the two ball race members 33 and 36 which produces, in the arrangement shown in Fig. 3, a speed of the driven shaft 42 and ball retaining member 39 substantially one half the speed of the driving ball race member 33 and motor 1.

In the event that a different speed reduction ratio other than two to one is desired, it is merely necessary to incline the spin axis X of the balls 38 to a degree other than 90° to the center line of the ball race members, the peak of the double isosceles triangle still resting on the center line of the axis of rotation. The ratio desired is the relation of the radial distances of the points of ball tangencies on either side of the isosceles triangle bases to the center line of rotation, plus 1. Referring again to Fig. 3, the ratio will be $$\frac{J}{K} + 1 \text{ or } \frac{K}{J} + 1, \text{ to } 1$$

depending on whether J or K is the radius to the driving race tangency.

The material for the ball retaining member 39 and the thrust disk 49 may be a moulded plastic such as polythene. In a transmission device actually constructed, this material was found to be satisfactory due to its durable characteristics, slight resilience, imperviousness to corrosive action of oil and grease, and the fact that it maintained its contour under various temperature conditions and provided a smooth and quiet transmission.

With the ball differential and bearing device described above, it is possible to obtain a substantial speed reduction (shown here as two to one) with high efficiency. This device has the ability to start and accelerate a considerable inertia load due to the controlled slip of the balls and will smooth out minute, non-uniform speed variations. The ball differential pressure can be adjusted to slip at any desired torque value under the maximum motor torque, thus providing a safety slip clutch sufficient to accelerate heavy inertia loads. The slip torque can be adjusted so that the motor will start under a stalled load and afford a smooth torque supply from zero to synchronous speed.

It will now be apparent, that the transmission and bearing device described above, in combining speed reducing and bearing elements into a single unit, is especially applicable for drives of recording and reproducing equipment, due to its compact size, improved efficiency, large torque capacity, ability to start a stalled load, and tendency to smooth out non-uniform speed variations. This device when utilized with a motor of the type described in the aforesaid application Serial Number 771,073, obviates the necessity for providing flywheels to obtain uniform speed, flyball governors to regulate speed, and complicated gearing generally associated with recording and reproducing apparatus thus effecting a substantial reduction in the overall weight and cost of such apparatus.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A driving and bearing mechanism for recording and reproducing apparatus and the like including, a driving motor having a rotor member, a driven shaft adapted to be connected to said apparatus, and means for connecting said motor to drive said driven shaft at a speed different from the speed of said motor, said means including a driving member secured to said rotor member and having an annular groove formed in a face thereof, a stationary member spaced from said driving member and having an annular groove formed in a face thereof coaxial with said first named groove, a plurality of intermediate antifriction planetary elements arranged between said members and engaging each of said grooves at two points, said driving and stationary members and said anti-friction elements forming a thrust and radial bearing supporting said rotor member, and a retaining member driven by said anti-friction elements and secured to said driven shaft for transmitting the planetary motion of said elements to said shaft whereby said shaft is driven at a speed different from the speed of said motor.

2. A driving and bearing mechanism for recording and reproducing apparatus and the like including, a driving motor having a rotor member, a driven shaft adapted to be connected to said apparatus, and means for connecting said motor to drive said driven shaft at a speed different from the speed of said motor, said means including a driving ball race member secured to said rotor member and having an annular groove formed in a face thereof, a stationary ball race member spaced from said driving member and having an annular groove formed in a face thereof coaxial with said first named groove, a plurality of planetary balls arranged between said members and positioned in said grooves, each of said grooves having two surfaces respectively tangent with said balls at two points, said ball race members and said planetary balls forming a thrust and radial bearing supporting said rotor member, and a retaining member driven by said balls and secured to said driven shaft for transmitting the planetary motion of said balls to said shaft whereby said shaft is driven at a speed different from the speed of said motor.

3. A driving and bearing mechanism for recording and reproducing apparatus and the like including, a driving motor having a rotor member, a driven shaft adapted to be connected to said apparatus, and means for connecting said motor to drive said driven shaft at a speed different from the speed of said motor, said means includng a driving ball race member secured to said rotor member and having an annular groove formed in a face thereof, a stationary ball race member spaced from said driving member and having an annular groove formed in a face thereof coaxial with said first named groove, a plurality of planetary balls arranged between said members and positioned in said grooves, each of said grooves having two surfaces respectively tangent with said balls at two points, said race members and said planetary balls forming a thrust and radial bearing supporting said rotor member and a retaining member driven by said balls and secured to said driven shaft for transmitting the planetary motion of said elements to said shaft whereby said shaft is driven at a speed different from said motor, and four points of tangency of said race member grooves with said balls being at the base points of a double isosceles triangle and the peak of said triangle being on the center line of said driven shaft whereby a rolling ball differential speed reduction is obtained.

4. A driving and bearing mechanism for recording and reproducing apparatus and the like including, a driving motor having rotor and stator members, a driven shaft adapted to be connected to said apparatus, and means for connecting said motor to drive said driven shaft at a speed different from the speed of said motor and for rotatively supporting said rotor and said driven shaft, said means including a driving ball race member secured to said rotor member and having an annular groove formed in a face thereof, a stationary member spaced from said driving member and having an annular groove formed in a face thereof coaxial with said first named groove, a plurality of intermediate planetary balls arranged between said members and engaging said grooves, said driving and stationary members and said balls forming a thrust and radial bearing supporting said rotor member, each of said grooves having two surfaces respectively tangent with said balls at two points, and a retaining member driven by said balls and secured to said driven shaft for transmitting the planetary motion of said balls to said shaft whereby said shaft is driven at a speed different from the speed of said motor.

5. A driving and bearing mechanism for recording and reproducing apparatus and the like including, a driving motor having rotor and stator members, a driven shaft adapted to be connected to said apparatus, and means for connecting said motor to drive said driven shaft at a speed different from the speed of said motor and for rotatably supporting said rotor and said driven shaft, said means including a driving race member secured to said rotor and having an annular groove formed in a face thereof, a stationary race member spaced from said driving member and having an annular groove formed in a face thereof coaxial with said first named groove, a plurality of intermediate planetary balls arranged between said members and engaging said grooves, each of said grooves having two surfaces respectively tangent with said balls at two points, said race members and said balls forming a thrust and radial bearing supporting said rotor member, a retaining member driven by said balls and secured to said driven shaft for transmitting the planetary motion of said balls to said shaft whereby said shaft is driven at a speed different from the speed of said motor, and resilient means for urging said driving race member toward said stationary race member whereby driving torque is provided for said retaining member and said balls will slip at a predetermined torque.

6. A driving and bearing mechanism for recording and reproducing apparatus and the like including, a driving motor having rotor and stator members, a driven shaft adapted to be connected to said apparatus, and means for connecting said motor to drive said driven shaft at a speed different from the speed of said motor and for rotatively supporting said rotor and said driven shaft, said means including a driving ball race member secured to said rotor member and having an annular groove formed in a side thereof, a stationary ball race member spaced from said driving member and having an annular groove formed in a side thereof coaxial and adjacent said first named groove, a plurality of intermediate planetary balls arranged between said members and engaging said grooves, each of said grooves having two surfaces respectively tangent with said balls at two points, said ball race members and said balls forming a thrust and radial bearing supporting said rotor member, the four points of tangency of said ball race member grooves with said balls being at the base points of a double isosceles triangle and the peak of said triangle being on the center line of said driving and driven shafts whereby a rolling ball differential speed reduction is obtained, a retaining member driven by said balls and secured to said driven shaft for transmitting the planetary motion of said balls to said shaft whereby said shaft is driven at a speed different from said motor, and a thrust spring member for resiliently urging said driving ball race member toward said stationary ball race member whereby driving torque is provided to said retaining member and said balls will slip at a predetermined torque.

7. A driving and bearing mechanism for recording and reproducing apparatus and the like including, a driving motor having rotor and stator members, a driven shaft adapted to be connected to said apparatus, and means for connecting said motor to drive said driven shaft at a speed different from the speed of said motor and for rotatively supporting said rotor and said driven shaft, said means including a driving ball race member secured to said rotor member and having an annular groove formed in a side thereof, a stationary ball race member spaced from said driving member and having an annular groove in a side thereof coaxial with and adjacent said first named groove, a plurality of intermediate planetary balls arranged between said members and engaging said grooves, each of said grooves having two surfaces respectively tangent to said balls at two points, said ball race members and said balls forming a thrust and radial bearing supporting said rotor member, the four points of tangency of said ball race member grooves with said balls being at the base points of a double isosceles triangle and the peak of said triangle being on the center line of said driven shaft whereby a rolling ball differential speed reduction is obtained, a retaining member driven by said balls and secured to said driven shaft for transmitting the planetary motion of said balls to said shaft whereby said shaft is driven at a speed different from the speed of said motor, a thrust spring member having one end abutting said driving ball race member for resiliently urging said member toward said stationary ball race member to provide driving torque to said retaining member and to allow slip of said balls at a predetermined torque, and a ball thrust bearing positioned at the other end of said spring member.

8. A speed-changing power transmission and bearing device comprising, a driving member adapted to be secured to the rotor member of an external source of mechanical driving power and having an annular groove formed in a face thereof, a stationary member spaced from said driving member and having an annular groove formed in a face thereof coaxial with said first named groove, a plurality of anti-friction planetary elements arranged between said members and engaging each of said grooves at two points, said members and said anti-friction elements forming a thrust and radial bearing adapted to support said rotor member, and a retaining member driven by said anti-friction elements and adapted to be secured to a driven shaft for transmitting the planetary motion of said elements to said shaft, said retaining member with said anti-friction elements and said driving and stationary members forming a speed-changing transmission whereby said shaft is driven at a speed different from the speed of said source of power.

9. A speed-changing power transmission and bearing device comprising, a driving ball race member adapted to be secured to the rotor member of an external source of mechanical power and having an annular groove formed in a face thereof, a stationary ball race member spaced from said driving member and having an annular groove formed in a face thereof coaxial with said first named groove, a plurality of intermediate planetary balls arranged between said members and engaging said grooves, each of said grooves having two points of tangency with said balls, said ball race members and said balls forming a thrust and radial bearing adapted to support said rotor member, and a retaining member driven by said balls and adapted to be secured to a driven shaft for transmitting the planetary motion of said balls to said shaft, said retaining member forming with said balls and said ball race members a speed-changing transmission whereby said shaft is driven at a speed different from said source of power.

10. A speed-changing power transmission and bearing device comprising, a driving ball race member adapted to be secured to the rotor member of an external source of mechanical power and having an annular groove formed in a side thereof, a stationary ball race member spaced from said driving member and having an annular groove formed in a side thereof coaxial with and adjacent said first named groove, a plurality of planetary balls arranged between said members and engaging said grooves, each of said grooves having two surfaces respectively tangent with said balls at two points, said ball race members and said balls forming a thrust and radial bearing adapted to support said rotor member, a retaining member driven by said balls and adapted to be secured to a driven shaft for transmitting the planetary motion of said balls to said shaft, said retaining member forming with said balls and said ball race members a speed-changing transmission whereby said shaft is driven at a speed different from the speed of said source of power, and resilient means for urging said driving ball race member toward said stationary ball race member to provide driving torque to said retaining member and to allow slip of said balls at a predetermined torque.

11. A speed-changing power transmission and bearing device comprising, a driving ball race member adapted to be secured to the rotor member of an external source of mechanical power and having an annular groove formed in a side thereof, a stationary ball race member spaced from said driving member and having an annular groove formed in a side thereof coaxial with and adjacent said first named groove, a plurality of planetary balls arranged between said members and engaging said grooves, each of said grooves having two surfaces respectively tangent with said balls at two points, the four points of tangency of said grooves with said balls being at the base points of a double isosceles triangle and the peak of said triangle on the center line of said driving member whereby a rolling ball differential speed reduction is obtained, said ball race members and said balls forming a thrust and radial bearing adapted to support said rotor member, a retaining member driven by said balls and adapted to be secured to a driven shaft for transmitting the planetary motion of said balls to said shaft, said retaining member forming with said balls and said ball race members a ball speed-reduction differential transmission whereby said shaft is driven at a speed different from the speed of said driving source of power, and a thrust spring member for resiliently urging said driving ball race member toward said stationary ball race member to provide driving torque to said retaining member to allow slip of said balls at a predetermined torque.

12. A speed-changing power transmission and bearing device comprising, a driving ball race member adapted to be secured to the rotor member of an external source of mechanical power and having an annular groove formed in a side thereof, a stationary ball race member spaced from said driving member and having an annular groove formed in a side thereof coaxial with and adjacent said first named groove, a plurality of planetary balls arranged between said members and engaging said grooves, each of said grooves having two surfaces respectively tangent with said balls at two points, the four points of tangency of said grooves with said balls being at the base points of a double isosceles triangle and the peak of said triangle being on the center line of said driving ball race member whereby a rolling ball differential speed reduction is obtained, said ball race members and said balls forming a thrust and radial bearing adapted to support said rotor-member, a retaining member driven by said balls and adapted to be secured to a driven shaft for transmitting the planetary motion of said balls to said shaft, said retaining member forming with said balls and said ball race members a ball speed-reduction differential transmission, whereby said shaft is driven at a speed different from the speed of said driving source of power.

13. A speed-changing power transmission and bearing device comprising, a driving ball race member adapted to be secured to the rotor member of an external source of mechanical power and having an annular groove formed in a side thereof, a stationary ball race member spaced from said driving member and having an annular groove formed in a side thereof coaxial with and adjacent said first named groove, a plurality of planetary balls arranged between said members and engaging said grooves, each of said grooves having two surfaces respectively tangent with said balls at two points, said ball race members and said balls forming a thrust and radial bearing adapted to support said rotor member, a retaining member driven by said balls and adapted to be secured to a driven shaft for transmitting the planetary motion of said balls to said shaft, said retaining member forming with said balls and said ball race members a ball speed-reduction differential transmission whereby said shaft is driven at a speed different from the speed of said driving source of power, a thrust spring member having one end abutting said ball race member for resiliently urging said driving ball race member toward said stationary ball race member to provide driving torque to said retaining member and to allow slip of said balls at a predetermined torque, and a ball thrust bearing abutting the other end of said thrust spring member.

HUGH M. STEPHENSON.

REFERENCES CITED

The following references are of record in the file of this patent:

UNITED STATES PATENTS

| Number | Name | Date |
| --- | --- | --- |
| Re. 18,175 | Erban | Sept. 1, 1931 |
| 518,321 | La Casse | Apr. 17, 1894 |
| 1,737,295 | Bronander | Nov. 26, 1929 |
| 1,757,476 | Rennerfelt | May 6, 1930 |
| 2,383,107 | Cherry et al. | Aug. 21, 1945 |

Certificate of Correction

Patent No. 2,467,870.                                                                 April 19, 1949.

HUGH M. STEPHENSON

It is hereby certified that error appears in the printed specification of the above numbered patent requiring correction as follows:

Column 10, line 23, claim 11, after the word "member" insert *and*;

and that the said Letters Patent should be read with this correction therein that the same may conform to the record of the case in the Patent Office.

Signed and sealed this 22nd day of November, A. D. 1949.

[SEAL]

THOMAS F. MURPHY,
*Assistant Commissioner of Patents.*